(12) United States Patent
Jain

(10) Patent No.: US 12,353,995 B2
(45) Date of Patent: Jul. 8, 2025

(54) DETERMINING CAUSALITY FOR CLOUD COMPUTING ENVIRONMENT CONTROLLER

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 1007 days.

(21) Appl. No.: 17/371,318

(22) Filed: Jul. 9, 2021

(65) Prior Publication Data

US 2022/0383101 A1 Dec. 1, 2022

(30) Foreign Application Priority Data

May 27, 2021 (IN) .............. 202111023598

(51) Int. Cl.
| | | |
|---|---|---|
| G06N 3/08 | (2023.01) | |
| G06F 11/07 | (2006.01) | |
| G06F 11/30 | (2006.01) | |
| G06F 11/34 | (2006.01) | |
| G06N 3/04 | (2023.01) | |
| G06N 3/0442 | (2023.01) | |
| G06N 3/09 | (2023.01) | |

(52) U.S. Cl.
CPC ........... G06N 3/08 (2013.01); G06F 11/3495 (2013.01); G06N 3/04 (2013.01); *G06F 11/0709* (2013.01); *G06F 11/079* (2013.01); *G06F 11/3006* (2013.01); *G06F 2201/86* (2013.01); *G06N 3/0442* (2023.01); *G06N 3/09* (2023.01)

(58) Field of Classification Search
CPC .. G06N 3/08; G06N 3/04; G06N 3/09; G06N 3/0442; G06N 20/00; G06N 20/10; G06N 20/20; G06F 11/3495; G06F 11/0709; G06F 11/079; G06F 2201/86; G06F 11/3006

See application file for complete search history.

(56) References Cited

U.S. PATENT DOCUMENTS

| | | | |
|---|---|---|---|
| 10,650,045 B2* | 5/2020 | Bequet | G06N 3/084 |
| 2019/0332272 A1* | 10/2019 | Mangione-Tran | G06F 11/3433 |
| 2020/0042371 A1* | 2/2020 | Park | G06F 11/008 |
| 2020/0125482 A1* | 4/2020 | Smith | G06N 3/045 |

(Continued)

OTHER PUBLICATIONS

Yiwen Hany et al,"Tailored Learning-Based Scheduling for Kubernetes-Oriented Edge-Cloud System", Jan. 17, 2001 arXiv: 2101.06582v1 [cs.DC] (Year: 2021).*

(Continued)

*Primary Examiner* — Shane D Woolwine
(74) *Attorney, Agent, or Firm* — Buckley, Maschoff & Talwalkar LLC

(57) ABSTRACT

A system and method are disclosed associated with a cloud computing environment. The system includes a tracing tool, coupled to a controller in the cloud computing environment, that captures sequences of events associated with the controller and a deployed workload. A detection engine may detect important event patterns in the sequences captured by the tracing tool using a PrefixSpan algorithm in connection with a specific controller action associated with the deployed workload. A neural network, trained with the detected important event patterns, may predict which important event patterns caused the controller to perform the specific action associated with the deployed workload.

15 Claims, 12 Drawing Sheets

(56) References Cited

U.S. PATENT DOCUMENTS

| | | | |
|---|---|---|---|
| 2020/0334809 A1* | 10/2020 | Vianu | G06V 30/1916 |
| 2021/0326035 A1* | 10/2021 | Jia | G06N 20/00 |
| 2022/0172037 A1* | 6/2022 | Kang | G06N 3/044 |
| 2022/0198265 A1* | 6/2022 | Cintas | G06F 18/2132 |
| 2023/0153428 A1* | 5/2023 | Mitani | G05B 23/02 |
| | | | 726/23 |

OTHER PUBLICATIONS

Xiang Lisa Li et al, "Prefix-Tuning: Optimizing Continuous Prompts for Generation", Jan. 1, 2021 dearXiv: 2101.00190v1 [cs.CL] (Year: 2021).*

* cited by examiner

| TRACE SEQUENCE | CLASSIFICATION |
|---|---|
| T1, T2, T3 | ERROR |
| T1, T3, T5 | ERROR |
| T2, T4 | NORMAL |
| T2, T3, T5 | NORMAL |
| T1, T2, T5 | ERROR |

FIG. 5

DATA = [

'a c d'.

'a b c'.

'c b a'.

'a a b'.

]

| CONTROLLER IDENTIFIER 1102 | CAPTURED EVENT TRACE 1104 | IMPORTANT SEQUENCES 1106 | NEURAL NETWORK IDENTIFIER 1108 | RESULT 1110 |
|---|---|---|---|---|
| C_101 | | | NN_101 | CAUSATION |
| C_101 | | | NN_101 | RECOMMENDATION |
| C_102 | | | NN_101 | ALERT |
| C_103 | | | NN_103 | CAUSATION |

DETERMINING CAUSALITY FOR CLOUD COMPUTING ENVIRONMENT CONTROLLER

BACKGROUND

An enterprise may use on-premises systems and/or a cloud computing environment to run applications and/or to provide services. For example, cloud-based applications may be used to process purchase orders, handle human resources tasks, interact with customers, etc. Moreover, a cloud computer environment may provide for an automating deployment, scaling, and management of "containerized" applications. As used herein, the term "container" may refer to a stand-alone, all-in-one package for a software application (e.g., including the application binaries, plus the software dependencies and the hardware requirements needed to run, all wrapped up into an independent, self-contained unit).

Kubernetes is one example of such an automated container orchestration approach. FIG. 1 is an example of a system 100 for a cloud computing environment that includes a kubernetes controller or operator 150 that monitors a deployed workload 110. In the Kubernetes world, a software control plane is based on principles of control theory. In particular, when a desired state 160 of the deployed workload 110 and an actual state of the deployed workload 110 differ, there is a "configuration drift." A role of the controller or operator 150 is to detect this drift and attempt to bring the actual state to the desired state 160. Application of control theory in the cloud domain works fine, but a gap exists. The controller or operator 150 does not establish a causality for the action that is taken. Instead, it just blindly takes the action to bring the actual state to the desired state 160 (without knowing why the situation arose in the first place).

It would therefore be desirable to automatically determine causality for a controller of a cloud computing environment in an efficient and accurate manner.

SUMMARY

According to some embodiments, methods and systems may facilitate an automatic determination of causality for a controller of a cloud computing environment. The system may include a tracing tool, coupled to a controller in the cloud computing environment, that captures sequences of events associated with the controller and a deployed workload. A detection engine may detect important event patterns in the sequences captured by the tracing tool using a PrefixSpan algorithm (e.g., a prefix-projected sequential pattern mining algorithm) in connection with a specific controller action associated with the deployed workload. A neural network, trained with the detected important event patterns, may predict which important event patterns caused the controller to perform the specific action associated with the deployed workload.

Some embodiments comprise: means for capturing, by a tracing tool coupled to a controller in the cloud computing environment, sequences of events associated with the controller and a deployed workload; means for detecting, by a detection engine coupled to the tracing tool, important event patterns in the sequences captured by the tracing tool, using a PrefixSpan algorithm in connection with a specific controller action associated with the deployed workload; and means for training a neural network with the detected important event patterns to predict which important event patterns caused the controller to perform the specific action associated with the deployed workload.

Some technical advantages of some embodiments disclosed herein are improved systems and methods associated with determining causality for a controller of a cloud computing environment in an efficient and accurate manner.

BRIEF DESCRIPTION OF THE DRAWINGS

FIG. 5 is a classification table in accordance with some embodiments.

FIG. 11 illustrates a causation database in accordance with some embodiments.

DETAILED DESCRIPTION

Figure 1:
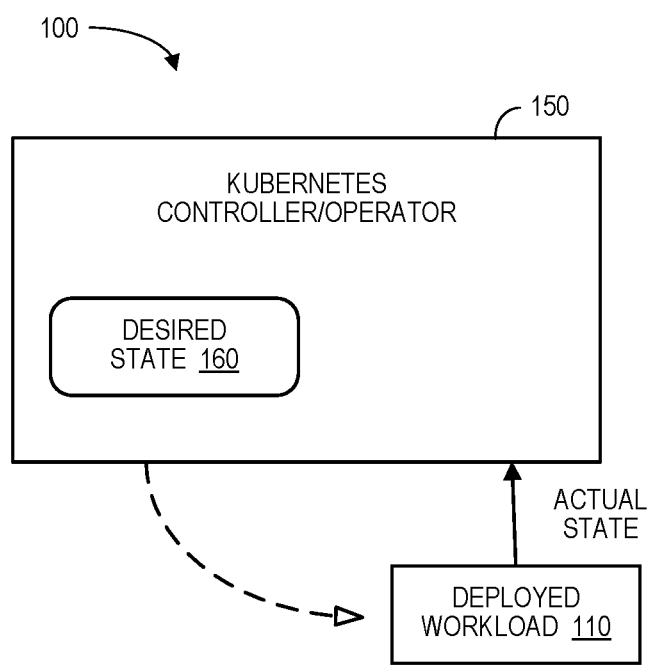
FIG. 1 is an example of a system for a cloud computing environment.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A role of a controller or operator is to detect configuration drift and attempt to bring an actual state of a deployed workload to a desired state 160. However, a controller or operator typically does not establish a causality for the action that is taken (it just takes the action to bring the actual state to the desired state without knowing why the situation arose in the first place). To address the gap of missing causality, some embodiments described herein perform the following:

establish the use of tracing tools, such as logs, which capture the events happening within the system;

detect the important patterns on sequence by running it via a sequential pattern mining algorithm, such as the PrefixSpan algorithm; and use a neural network with attention mechanism (so that important events are given more weight) to predict what pattern of events in a sequence lead to an issue.

Consider, for example an event trace that captures controller activity associated with spinning one instance. The collected trace from a distributed tracing system for last few minutes might be illustrated by the event trace log 200 of FIG. 2 (captured after a controller spins a new instance). The event trace log 200 shows that a HyperText Transfer Protocol ("HTTP") request for a document upload service occurred at 210. The request was passed to a service pod at 220, and the service pod begins to handle the request via a thread with an ID of T1 at 230. At 240, a buffer to a size equal to the document is allocated. An Out Of Memory ("OOM") exception occurs at 250 and the kube scheduler creates a new pod at 260. Note that there will be various other traces where the document upload request succeeded because the document size was sufficiently small. Since the HTTP request parameters also capture the size of the document, there is enough metadata to be used for classification as described with respect to FIGS. 5 through 8.

Figure 3:
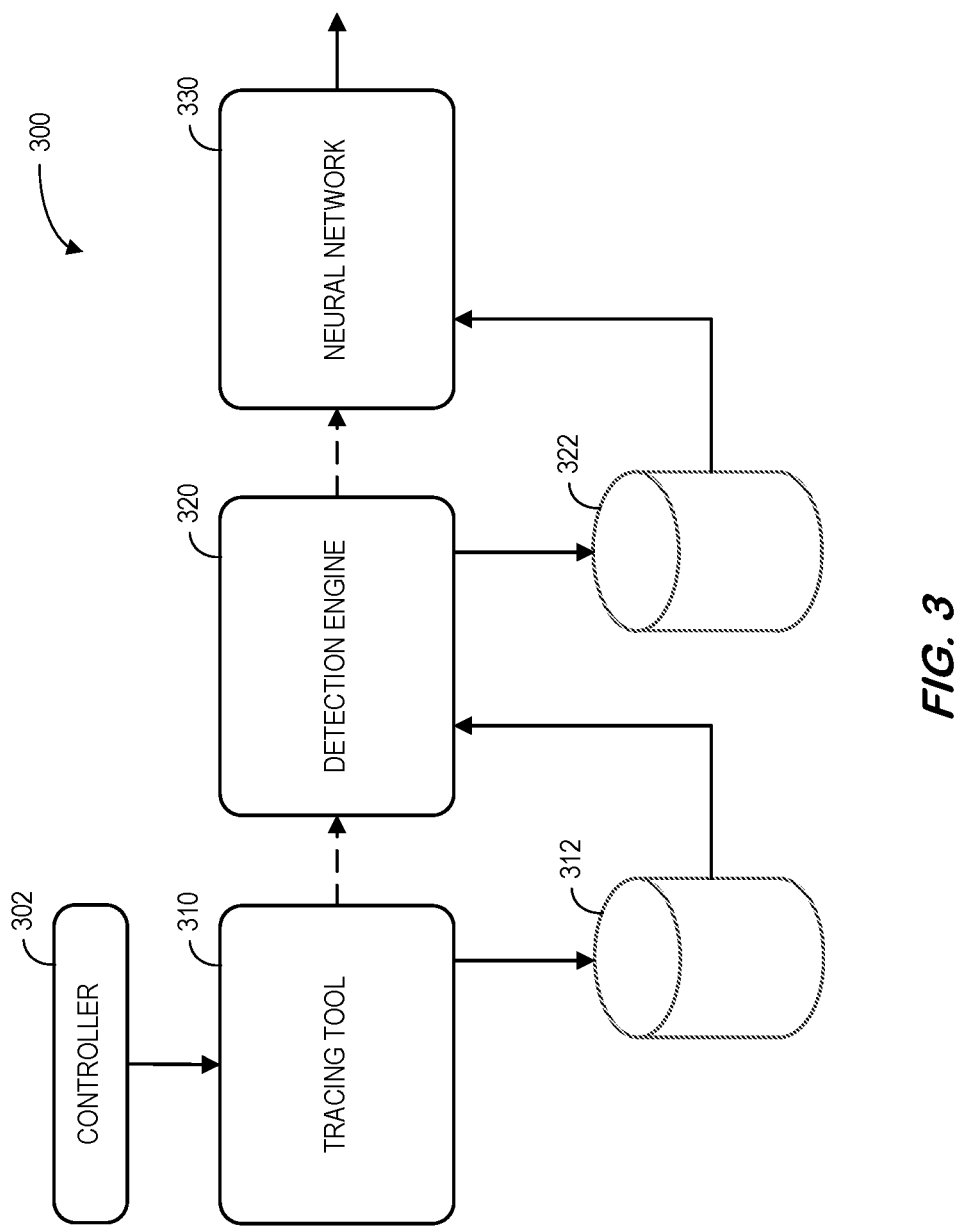
FIG. 3 is a high-level block diagram of a system in accordance with some embodiments.

FIG. 3 is a high-level block diagram of a system 300 that monitors a controller 302 according to some embodiments. A tracing tool 310 (e.g., similar to one that would be used during a debugging process) coupled to the controller 302 captures sequences of events associated with the controller 302 and a deployed workload. A detection engine 320 receives the sequences of events either from a storage device 312 or directly from the tracing tool 310 (as illustrated by a dashed arrow in FIG. 3). The detection engine detects important event patterns in the sequences captured by the tracing tool using a PrefixSpan mining algorithm in connection with a specific controller action associated with the deployed workload. A neural network 330 receives the important event patterns either from a storage device 322 or directly from the detection engine 3320 (as illustrated by a dashed arrow in FIG. 3). The neural network 330 is trained with the detected important event patterns and automatically predicts which important event patterns caused the controller 302 to perform the specific action associated with the deployed workload. A used herein, the term "automatically" may refer to a device or process that can operate with little or no human interaction.

According to some embodiments, devices, including those associated with the system 300 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 300 may store data into and/or retrieve data from various data stores (e.g., the storage devices 312, 322), which may be locally stored or reside remote from the tracing tool 310, detection engine 320 and neural network 330. Although a single tracing tool 310, detection engine 320 and neural network 330 are shown in FIG. 3, any number of such devices may be included. Moreover, various devices described herein might be combined according to embodiments of the present invention. For example, in some embodiments, the tracing tool 310 and storage device 312 might comprise a single apparatus. Some or all of the system 300 functions may be performed by a constellation of networked apparatuses, such as in a distributed processing or cloud-based architecture.

A user (e.g., a database administrator) may access the system 300 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to setup the tracing tool 310) and/or provide or receive automatically generated recommendations, results, and/or alerts from the neural network.

Figure 4:
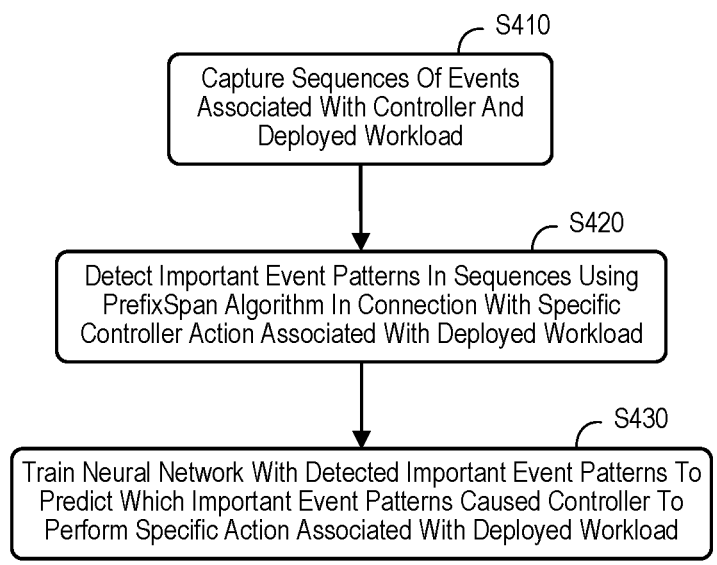
FIG. 4 illustrates a method to establish causality associated with a controller in a cloud computing environment according to some embodiments.

FIG. 4 illustrates a method to facilitate an automatic determination of causality for a controller of a cloud computing environment according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, the system may capture sequences of events associated with the controller and a deployed workload. The tracing tool might be, for example, associated with an event log and the controller might comprise a kubernetes operator for an application deployed within a kubernetes cluster as a pod.

At S420, a detection engine coupled to the tracing tool may detect important event patterns in the sequences captured by the tracing tool. According to some embodiments, the detection engine uses a PrefixSpan algorithm in connection with a specific controller action associated with the deployed workload. The sequences of events might include events associated with, for example, a hyper-text transfer protocol request, a service pod handling a request, an allocation of a buffer size, etc. The specific controller action might be associated with, for example, spinning up another application, creation of a new pod by a kubernetes scheduler, detection of configuration drift, etc.

At S430, a neural network is trained with the detected important event patterns to predict which important event patterns caused the controller to perform the specific action associated with the deployed workload. According to some embodiments, the neural network comprises a Recurrent Neural Network ("RNN"). In particular, the RNN comprises an attention based Long Short-Term Memory ("LSTM") neural network. Note that a LSTM neural network is used in the field of deep learning and, unlike standard feedforward neural networks, has feedback connections. Moreover, LSTM are used in data which are temporal in nature and (unlike RNN) LSTM do not suffer from problems of vanishing and exploding gradients. As a result, it can not only process single data points but also entire sequences of data. The prediction from the neural network may be used, for example, to generate a potential problem report, an electronic automated alert message, etc.

Consider an example where an application is deployed within a Kubernetes cluster as a pod. The application suffers from a memory leak, and, as the number of requests grows, the application experiences an OOM exception and crashes. The pod operator sees that the actual state doesn't match the desired state and spins up another application. After a period of time, this application also starts to leak memory, experiences an OOM, and crashes. The problem here is that the system needs a way to establish a causality to the actions being taken by the operator (spinning up another application). This causality can be helpful when performing a course correction such as by changing a configuration of the application, giving it more resources if needed, etc.

Figure 2:
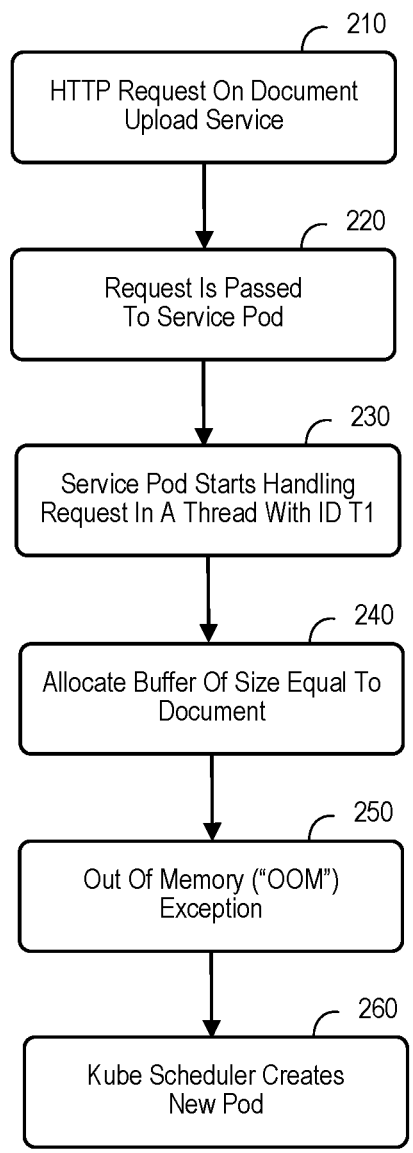
FIG. 2 is an example of an event trace log captured after a controller spins a new instance.

To determine causality, the system may capture an event trace of controller activity prior to spinning one instance (as shown in FIG. 2). There will be various other traces where document upload request did not crash because document sizes were sufficiently small. Because the HTTP request parameters also capture the size of the document, there is enough metadata to be used for classification. Accord to some embodiment, the request traces are placed into one of two classifications or labels:

requests that supposedly caused an issue (big size document request); and requests that went normally (normal document uploads).

Figure 6:
FIG. 6 is an example of data set to be provided to a PrefixScan algorithm according to some embodiments.

FIG. 5 is a classification table 500 in accordance with some embodiments. The table 500 includes information about the trace sequence 510 and an associated classification 520. For example, trace sequence 510 "T1, T2, T3" resulted in an error while trace sequence 510 "T2, T4" did not. Information about the trace sequences is first run through a PrefixSpan algorithm to extract most important sequences for both classifications 520. As used herein, a sequence might be "important" if, for example, it might be associated with the controller subsequently performing a specific action (e.g., spinning a new instance of a deployed workload). FIG. 6 is an example of a data set 600 that could be provided to a PrefixScan algorithm according to some embodiments. The output after running it via the PrefixSpan algorithm would be as follows:

{'a': 5, 'a c': 2, 'a b': 2, 'c': 3, 'b': 3}

Figure 7:
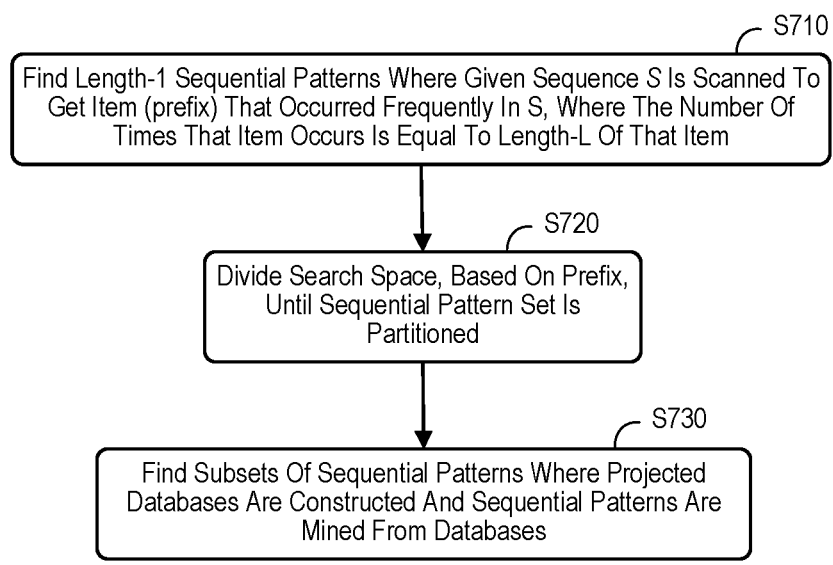
FIG. 7 illustrates a PrefixScan algorithm in accordance with some embodiments.

FIG. 7 illustrates a PrefixScan algorithm 700 in accordance with some embodiments. At S710, the system finds length-1 sequential patterns where a given sequence S is scanned to get item (prefix) that occurred frequently in S, where the number of times that an item occurs is equal to length-1 of that item. At S720, the system divides a search space, based on a prefix, until a sequential pattern set is partitioned. At S730, the system finds subsets of sequential patterns where projected databases are constructed, and sequential patterns are mined from the databases. This may be done for both of the classifications. After the set of important traces or sequences is obtained, an attention based LSTM neural network is used to model the event traces as a sequence learning problem.

In, normal sequence modelling all events in a sequence are treated as equal. In the previous example the size of a document is an equal event as the thread creation on the server side (although they are not really equal events). To overcome this problem, an attention based model will force the neural network to attend to the more useful events in a sequence. Each event in a sequence may be represented as a vector in a high dimension mathematical space. These vectors maybe passed as inputs to the LSTM network which has a build-in attention module. If the request event vector constitutes a large document it will be attended more and paid more attention to when classifying an outcome. Similarly, when creation of more threads leads to an issue, the same event may become more important in a classification. The end goal is to detect which events are more crucial in trace (sequence of events).

Figure 8:
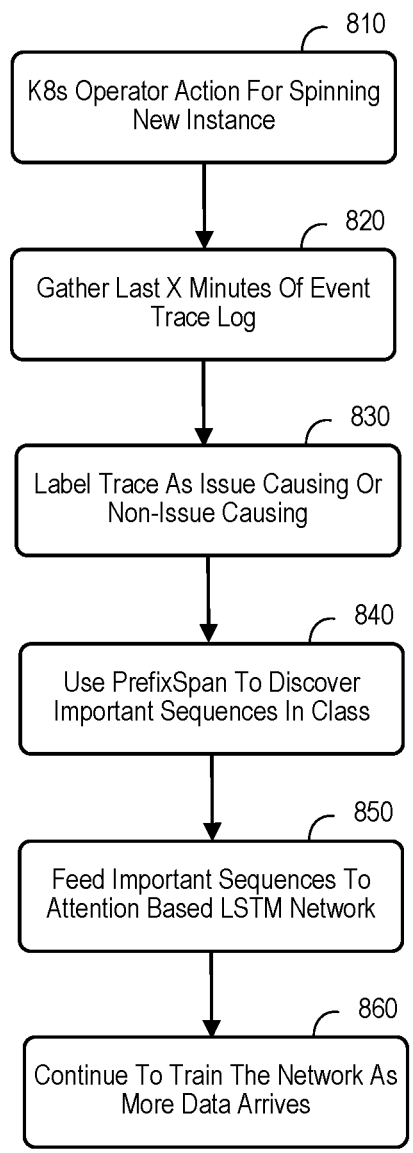
FIG. 8 is a training workflow according to some embodiments.

FIG. 8 is a training workflow 800 according to some embodiments. At 810, a K8s operator action to spin a new instance occurs and is detected. At 820, the last X minutes of the event trace log are gathered. At 830, the trace is labeled as either "issued causing" or "non-issue causing." At 840, PrefixSpan is used to discover important sequences in class. At 850, the important sequences are fed into an attention based LSTM neural network. At 860, the system continues to train the network as more data arrives. Once trained the network can be used by the K8s operator to attribute a causality to the specific action which it has taken.

Figure 9:
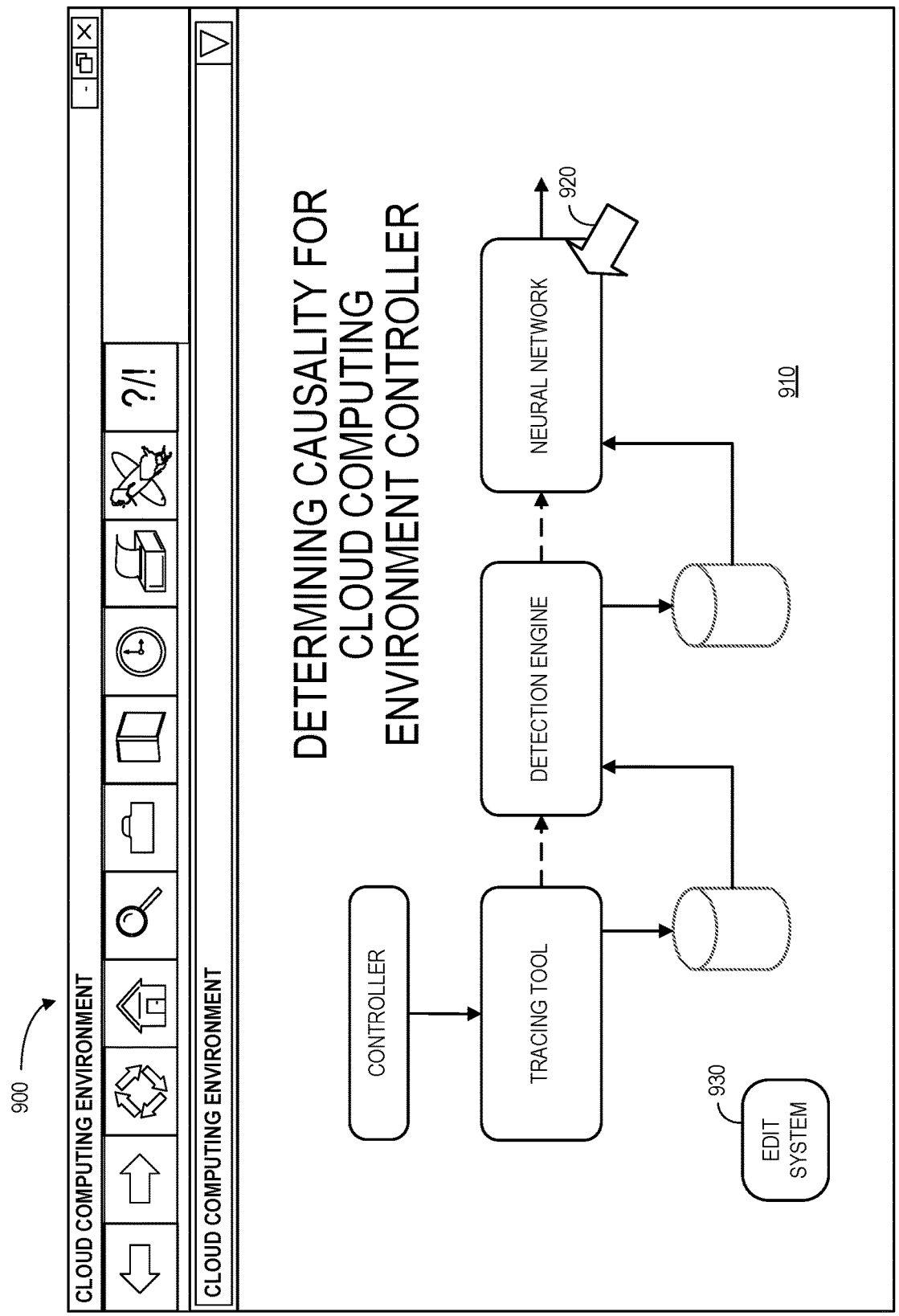
FIG. 9 is a human machine interface display in accordance with some embodiments.

FIG. 9 is a human machine interface display 900 in accordance with some embodiments. The display 900 includes a graphical representation 910 or dashboard that might be used to manage or monitor a personalized serverless function system framework (e.g., associated with a cloud provider). In particular, selection of an element (e.g., via a touchscreen or computer mouse pointer 920) might result in the display of a popup window that contains configuration data. The display 900 may also include a user selectable "Edit System" icon 930 to request system changes (e.g., to investigate or improve system performance).

Figure 10:
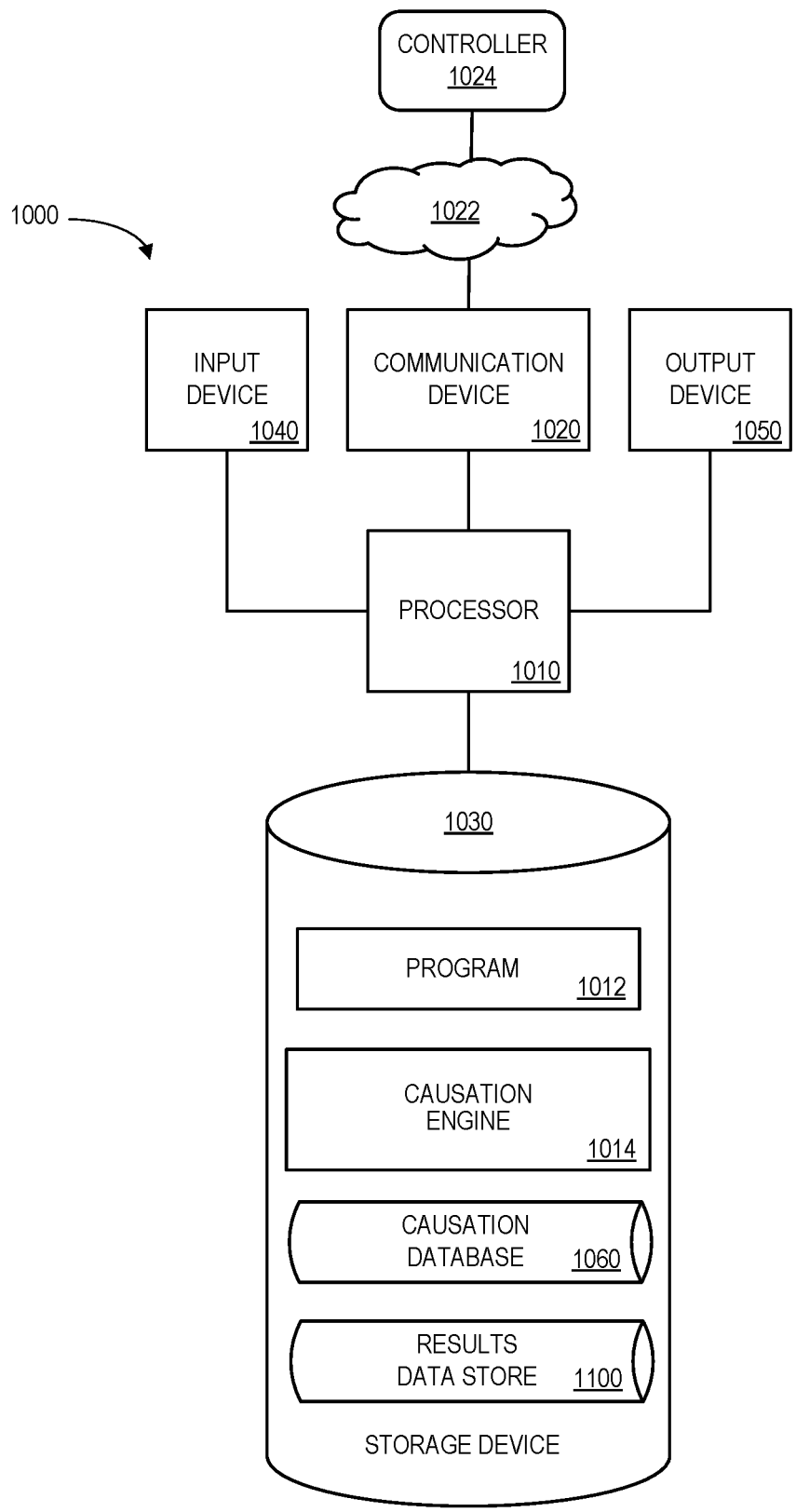
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 300 of FIG. 3 (and/or any other system described herein). The platform 1000 comprises a processor 1010, such as one or more commercially available CPUs in the form of one-chip microprocessors, coupled to a communication device 1020 configured to communicate via a communication network (not shown in FIG. 10). The communication device 1020 may be used to communicate, for example, with one or more remote user platforms or a controller 1024 via a communication network 1022. The platform 1000 further includes an input device 1040 (e.g., a computer mouse and/or keyboard to input data about tracing tool or neural network preferences) and an output device 1050 (e.g., a computer monitor to render a display, transmit recommendations or alerts, and/or create causation reports). According to some embodiments, a mobile device and/or PC may be used to exchange data with the platform 1000.

The processor 1010 also communicates with a storage device 1030. The storage device 1030 can be implemented as a single database or the different components of the storage device 1030 can be distributed using multiple databases (that is, different deployment data storage options are possible). The storage device 1030 may comprise any appropriate data storage device, including combinations of magnetic storage devices (e.g., a hard disk drive), optical storage devices, mobile telephones, and/or semiconductor memory devices. The storage device 1030 stores a program 1012 and/or causation engine 1014 for controlling the processor 1010. The processor 1010 performs instructions of the programs 1012, 1014, and thereby operates in accordance with any of the embodiments described herein. For example, the processor 1010 may facilitate an automatic determination of causality for a controller 1024 of a cloud computing environment. The processor 1010 may capture sequences of events associated with the controller and a deployed workload. The processor 1010 may also detect important event patterns in the sequences captured by the tracing tool using a PrefixSpan algorithm in connection with a specific controller action associated with the deployed workload. The processor 1010 may train a neural network with the detected important event patterns, so that the neural network can predict which important event patterns caused the controller 1024 to perform the specific action associated with the deployed workload.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, data may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a causation database 1100. An example of a database that may be used in connection with the platform 1000 will now be described in detail with respect to FIG. 11. Note that the database described herein is only one example, and additional and/or different data may be stored therein. Moreover, various databases might be split or combined in accordance with any of the embodiments described herein.

Referring to FIG. 11, a table is shown that represents the causation database 1100 that may be stored at the platform 1000 according to some embodiments. The table may include, for example, entries identifying associated with specific controller actions (e.g., spinning a new instance) in a cloud computing environment. The table may also define fields 1102, 1104, 1106, 1108, 1110 for each of the entries. The fields 1102, 1104, 1106, 1108, 1110 may, according to some embodiments, specify: a controller identifier 1102, a captured event trace 1104, important sequences 1106, a neural network identifier 1108, and a result 1110. The causation database 1100 may be created and updated, for example, when a new controller action is detected, when results 1110 are generated, etc.

The controller identifier 1102 might be a unique alphanumeric label or link that is associated with a kubernetes operator. The captured event trace 1104 might be based on a log file, and the important sequences 1106 may be identified by a PrefixSpan algorithm. The neural network identifier 1108 might identify a LSTM neural network, and the result 1110 might comprise a causation conclusion, a recommendation (e.g., add new resources), an alert, etc.

In this way, embodiments may facilitate an automatic determination of causality for a controller of a cloud computing environment in an efficient and accurate manner. Note that embodiments may add a value into the existing k8s operators in a non-intrusive way. Embodiments may make existing operators have more intelligence and have an ability to attribute a causal inference on the actions they take. This would allow an administrator to make their software components better in terms of coding or reducing outages. Once the operator starts to attribute a cause to its actions, it can be of great value to all software components deployed on k8s. The model is generic, and the examples provided herein are used only to illustrate how the model fits into the overall K8s ecosystem.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
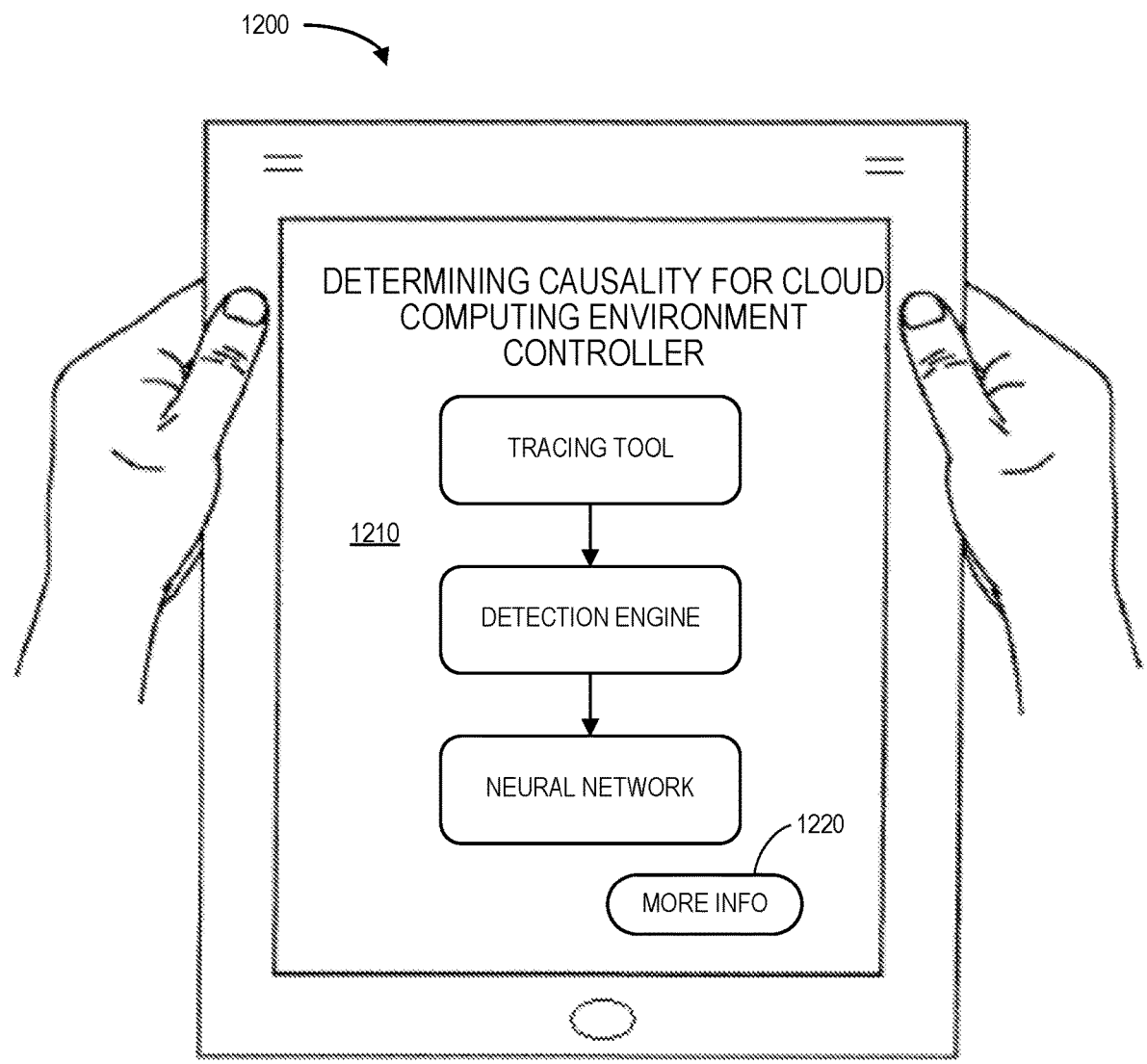
FIG. 12 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of application errors, any of the embodiments described herein could be applied to other types of application errors. Moreover, the displays shown herein are provided only as examples, and any other type of user interface could be implemented. For example, FIG. 12 shows a handheld tablet computer 1200 rendering a causation display 1210 that may be used to view or adjust existing system framework components and/or to request additional data (e.g., via a "More Info" icon 1220).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
    a tracing tool, coupled to a controller in the cloud computing environment, that captures sequences of memory leak events associated with the controller and a deployed workload, wherein the sequences of memory leak events include memory leak events associated with: a hyper-text transfer protocol request, a service pod handling a request, and an allocation of a buffer size;
    a detection engine, comprising:
        a computer processor, and
        a computer memory coupled to the computer processor and storing instructions that, when executed by the computer processor, cause the detection engine to detect important memory leak event patterns in the sequences captured by the tracing tool using a PrefixSpan algorithm in connection with a specific controller action associated with the deployed workload; and
        an attention based Long Short-Term Memory ("LSTM") neural network, trained with the detected important memory leak event patterns, that predicts which important memory leak event patterns caused the controller to perform the specific action associated with the deployed workload and the LSTM neural network is continued to be trained as more data arrives,
    wherein the detection engine automatically transmits an electronic recommendation result message, via a communication network, in accordance with the predicted important memory leak event patterns.

2. The system of claim 1, wherein the tracing tool is associated with an event log.

3. The system of claim 1, wherein the controller comprises a kubernetes operator for an application deployed within a kubernetes cluster as a pod.

4. The system of claim 1, wherein the PrefixSpan algorithm comprises:

finding length-1 sequential patterns where a given sequence Sis scanned to get item (prefix) that occurred frequently in S, where the number of times that an item occurs is equal to length-1 of that item, dividing a search space, based on a prefix, until a sequential pattern set is partitioned, and finding subsets of sequential patterns where projected databases are constructed and sequential patterns are mined from the databases.

5. The system of claim 1, wherein the specific controller action is associated with at least one of (i) spinning up another application, (ii) creation of a new pod by a kubernetes scheduler, and (iii) detection of configuration drift.

6. The system of claim 1, wherein a prediction from the neural network is further used to generate a potential problem report.

7. A computer-implemented method associated with a cloud computing environment, comprising:

capturing, by a tracing tool coupled to a kubernetes operator in the cloud computing environment, sequences of memory leak events associated with a controller and a deployed workload comprising an application deployed within a kubernetes cluster as a pod, wherein the sequences of memory leak events include events associated wit: a hyper-text transfer protocol request, a service pod handling a request, and an allocation of a buffer size;

detecting, by a detection engine coupled to the tracing tool, important memory leak event patterns in the sequences captured by the tracing tool, using a PrefixSpan algorithm in connection with a specific operator action associated with the deployed workload;

training an attention based Long Short-Term Memory ("LSTM") neural network with the detected important memory leak event patterns to predict which important memory leak event patterns caused the operator to perform the specific action associated with the deployed workload, and continually training the LSTM neural network as more data arrives, wherein the detection engine automatically transmits an electronic recommendation result message, via a communication network, in accordance with the predicted important memory leak event patterns.

8. The method of claim 7, wherein the tracing tool is associated with an event log.

9. The method of claim 7, wherein the PrefixSpan algorithm comprises:

finding length-1 sequential patterns where a given sequence S is scanned to get item (prefix) that occurred frequently in S, where the number of times that an item occurs is equal to length-1 of that item, dividing a search space, based on a prefix, until a sequential pattern set is partitioned, and finding subsets of sequential patterns where projected databases are constructed and sequential patterns are mined from the databases.

10. The method of claim 7, wherein the specific operator action is associated with at least one of (i) spinning up another application, (ii) creation of a new pod by a kubernetes scheduler, and (iii) detection of configuration drift.

11. A system comprising:

at least one programmable processor; and a non-transitory machine-readable medium storing instructions that, when executed by the at least one programmable processor, cause the at least one programmable processor to perform operations comprising:

capturing, by a tracing tool coupled to a controller in a cloud computing environment, sequences of memory leak events associated with a controller and a deployed workload, wherein the sequences of memory leak events include memory leak events associated with: a hyper-text transfer protocol request, a service pod handling a request, and an allocation of a buffer size, detecting, by a detection engine coupled to the tracing tool, important memory leak event patterns in the sequences captured by the tracing tool, using a PrefixSpan algorithm in connection with a specific controller action associated with the deployed workload, training an attention based Long Short-Term Memory ("LSTM") neural network with the detected important memory leak event patterns to predict which important memory leak event patterns caused the controller to perform the specific action associated with the deployed workload, and continually training the LSTM neural network as more data arrives wherein the detection engine automatically transmits an electronic recommendation result message, via a communication network, in accordance with the predicted important memory leak event patterns.

12. The system of claim 11, wherein the tracing tool is associated with an event log.

13. The system of claim 12, wherein the controller comprises a kubernetes operator for an application deployed within a kubernetes cluster as a pod.

14. The system of claim 11, wherein the PrefixSpan algorithm comprises:

finding length-1 sequential patterns where a given sequence S is scanned to get item (prefix) that occurred frequently in S, where the number of times that an item occurs is equal to length-1 of that item, dividing a search space, based on a prefix, until a sequential pattern set is partitioned, and finding subsets of sequential patterns where projected databases are constructed and sequential patterns are mined from the databases.

15. The system of claim 11, wherein the specific operator action is associated with at least one of (i) spinning up another application, (ii) creation of a new pod by a kubernetes scheduler, and (iii) detection of configuration drift.

\* \* \* \* \*